UNITED STATES PATENT OFFICE.

ANDREW D. MARTIN, OF ABBEVILLE, ASSIGNOR TO MARIE EUGÉNIE PETETIN, OF NEW IBERIA, LOUISIANA.

HARNESS-OIL.

SPECIFICATION forming part of Letters Patent No. 278,808, dated June 5, 1883.

Application filed May 23, 1882. (No specimens.)

*To all whom it may concern:*

Be it known that I, ANDREW D. MARTIN, of Abbeville, Vermilion parish, State of Louisiana, have invented or discovered a new and Improved Composition for Harness-Oil, of which the following is a specification.

The object of my invention or discovery is to furnish a harness-oil for domestic use that will be cheap and effective for softening and preserving leather, and may be used with profit in tanneries, saddlery-shops, shoe-shops, &c. This composition claims to be superior in many respects to any ever discovered. Its principal ingredient (cotton-seed oil) has a very penetrating influence, and with the assistance of the other ingredients its gluey matter is entirely neutralized. This oil will preserve its virtue and will not congeal in cold temperature.

My discovery or invention consists in the compounding of the following ingredients, in proportions as here given, viz: eighty per cent. cotton-seed oil, ten per cent. turpentine, five per cent. alcohol, and five per cent. coal-oil.

The oil may be put up in cans or in casks, as convenience of shipment may require.

Having thus described my discovery, what I claim as new, and desire to secure by Letters Patent, is—

The herein-described composition of matter to be used as a harness-oil, consisting of cotton-seed oil, turpentine, alcohol, and coal-oil, in the proportions specified.

A. D. MARTIN.

Witnesses:
T. D. DUPUY,
NUMA FREDRICK.